US012630235B2

(12) United States Patent
Standifer

(10) Patent No.: US 12,630,235 B2
(45) Date of Patent: May 19, 2026

(54) AUTOSLIDE TRAILER HITCH HAVING AN ADJUSTABLE WHEEL ASSEMBLY

(71) Applicant: Ford Global Technologies, LLC, Dearborn, MI (US)

(72) Inventor: Cliff Standifer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 933 days.

(21) Appl. No.: 17/899,147

(22) Filed: Aug. 30, 2022

(65) Prior Publication Data

US 2024/0067277 A1 Feb. 29, 2024

(51) Int. Cl.
B62D 53/08 (2006.01)

(52) U.S. Cl.
CPC ................................ B62D 53/0807 (2013.01)

(58) Field of Classification Search
CPC .. B62D 53/0807; B62D 53/0814; B60D 1/50; B60D 1/54
USPC .................................. 280/441.1, 438.1, 441
See application file for complete search history.

(56) References Cited

U.S. PATENT DOCUMENTS

| | | | |
|---|---|---|---|
| 2,714,018 A * | 7/1955 | Colpo ................ | B62D 53/0807 280/441.1 |
| 4,359,234 A | 11/1982 | Mittelstadt | |
| 7,506,886 B2 * | 3/2009 | Warnock ........... | B62D 53/0814 280/433 |
| 8,220,818 B1 * | 7/2012 | Pulliam .............. | B62D 53/0814 280/441 |
| 9,834,422 B2 | 12/2017 | Koyama | |
| 10,850,581 B1 * | 12/2020 | Kraai ..................... | B60D 1/015 |
| 11,034,398 B2 | 6/2021 | Curl et al. | |
| 2004/0009849 A1 * | 1/2004 | Galbraith ........... | A63B 22/0076 482/51 |
| 2014/0265244 A1 * | 9/2014 | Curl ................... | B62D 53/0814 280/441.1 |

* cited by examiner

*Primary Examiner* — Christopher B Wehrly
(74) *Attorney, Agent, or Firm* — Lorne Forsythe; Hanley, Flight & Zimmerman, LLC

(57) ABSTRACT

An autoslide trailer hitch having an adjustable wheel assembly is disclosed. An example trailer hitch disclosed herein includes a base fixedly couplable to a vehicle bed of a vehicle, the base including a rail, a carriage slidably coupled to the rail via at least one wheel assembly, the at least one wheel assembly including a first wheel to contact a top surface of the rail, and a second wheel to contact a bottom surface of the rail, and a head rotatably coupled to the carriage, the carriage to slide along the rail between a first position and a second position in response to rotation of the head.

20 Claims, 12 Drawing Sheets

AUTOSLIDE TRAILER HITCH HAVING AN ADJUSTABLE WHEEL ASSEMBLY

FIELD OF THE DISCLOSURE

This disclosure relates generally to vehicles and, more particularly, to an autoslide trailer hitch having an adjustable wheel assembly.

BACKGROUND

A trailer hitch is used to couple a trailer to a vehicle. Typically, the trailer hitch is coupled to a bed and/or a frame of the vehicle and further coupled to the trailer. The trailer hitch head can rotate and travel rearward so that the trailer can maintain clearance with the vehicle during turning of the vehicle.

SUMMARY

A first example trailer hitch includes a base fixedly couplable to a vehicle bed of a vehicle. The base includes a rail, and a carriage is slidably coupled to the rail via at least one wheel assembly. The at least one wheel assembly includes a first wheel to contact a top surface of the rail, and a second wheel to contact a bottom surface of the rail. A head is rotatably coupled to the carriage, and the carriage is to slide along the rail between a first position and a second position in response to rotation of the head.

A second example trailer hitch includes a base and a carriage slidably coupled to rails of the base. The carriage includes first rollers to roll along an upper surface of the rails, second rollers to roll along a lower surface of the rails, and third rollers to roll along a side surface of the rails. A head is rotatably coupled to the carriage. The carriage is to slide along the rails between a first position and a second position in response to a rotation of the head.

An example apparatus includes means for coupling rails to a vehicle bed. Means for translating slidably is coupled to the means for coupling. The means for translating includes first means for rolling to contact a top surface of the rails, and second means for rolling to contact a bottom surface of the rails. Means for rotating is rotatably coupled to the means for translating. The means for translating is to slide along the means for coupling between a first position and a second position in response to rotation of the means for rotating.

Figures 1A, 1B:
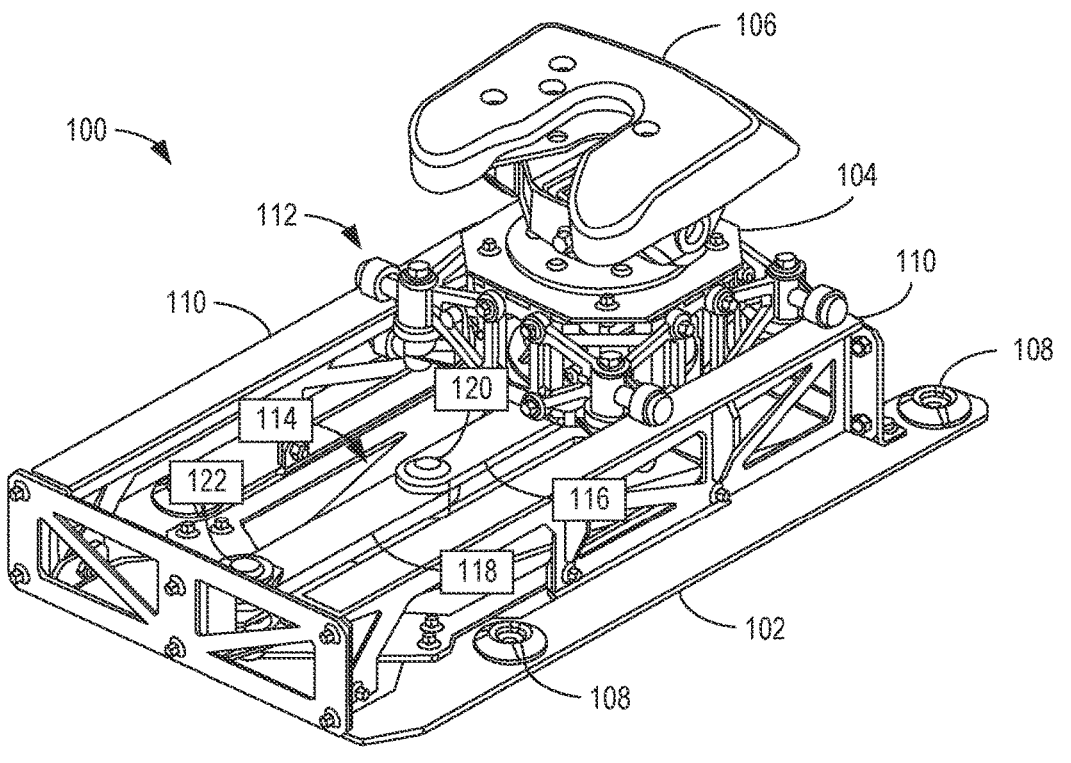
FIG. 1A illustrates an example trailer hitch in accordance with teachings of this disclosure.
FIG. 1B illustrates a top view of the example trailer hitch of FIG. 1A.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

DETAILED DESCRIPTION

A trailer hitch (e.g., a fifth wheel hitch) is typically used to couple a trailer to a vehicle (e.g., a truck). The trailer hitch can include a base coupled to a vehicle bed and/or a vehicle frame of the vehicle and a head to be coupled to the trailer. In some instances, as the vehicle turns, rotation of the head allows the trailer to turn with the vehicle. In some cases, sharp turns (e.g., 90 degree turns or greater) made by the vehicle can result in reduced clearance between the trailer and a cab of the vehicle. Such reduced clearance is particularly common for short bed trucks, where the vehicle bed has a substantially shorter length compared to a typical truck bed (e.g., having a length of 8 feet (ft)) and, thus, a clearance between the trailer and the vehicle cab is reduced.

Typically, vehicle performance is improved when a load of the trailer on the vehicle is positioned on a location of the vehicle bed and/or the vehicle frame that is directly above and/or slightly forward relative to a rear axle of the vehicle. Thus, a trailer hitch is typically coupled to the vehicle bed and/or the vehicle frame at or near such a location. However, in short bed trucks, positioning of the trailer hitch proximate the rear axle may result in reduced clearance between the vehicle cab and the trailer during sharp turns. To increase the clearance, some trailer hitches allow an operator of the vehicle to manually shift the trailer hitch rearward during turning. Such trailer hitches can be inconvenient for the operator by requiring additional input from the operator while driving.

Examples disclosed herein include an autoslide trailer hitch having an adjustable wheel assembly that provides smooth fore-aft travel along a vehicle bed and/or vehicle frame of a vehicle. The example trailer hitch disclosed herein includes an example base fixedly coupled to the vehicle bed, where the base includes one or more example rails extending parallel to a longitudinal axis of the base. An example carriage is slidably coupled to the rail via at least one example wheel assembly. In some examples, the wheel assembly includes an example top wheel to roll along a top surface of the rail, an example bottom wheel to roll along a bottom surface of the rail, and an example guide wheel to roll along a side surface of the rail. In some examples, an example head is rotatably coupled to the carriage such that rotation of the head causes the carriage, via the wheel assemblies, to translate along the rails. In some examples, an example adjustment bolt can be used to adjust a clamping force of the top and bottom wheels on the rail. Further, one or more example dampers (e.g., disc springs, compression springs, conical washers) can be operatively coupled to the top wheel and/or the bottom wheel to bias the wheels toward a respective surface of the rail.

Advantageously, examples disclosed herein implement a linkage instead of a cam mechanism to convert rotation of a head to linear travel of the trailer hitch. Precise manufacturing of holes and pins of the linkage can reduce gapping and, in turn, produce smooth travel of the trailer hitch. Further, the dampers implemented in each of the wheel assemblies enable the wheels to maintain contact with and/or roll along the rail, thus enabling improved operation of the trailer hitch when the trailer hitch is subject to external forces (e.g., vibratory and/or frictional loads during travel of the vehicle) and/or when debris is present on the rail.

FIG. 1A illustrates an example trailer hitch (e.g., an autoslide trailer hitch, a fifth wheel hitch) 100 in accordance with teachings of this disclosure. In the illustrated example of FIG. 1A, the trailer hitch 100 includes an example base 102, an example carriage 104 slidably coupled to the base 102, and an example head 106 rotatably coupled to the carriage 104. In this example, the base 102 is fixedly couplable to a vehicle bed (e.g., a truck bed) and/or to a vehicle frame via one or more example anchor bushings 108. In the illustrated example, the carriage 104 is slidably coupled to example rails 110 of the base 102 via one or more example wheel assemblies 112, such that the carriage 104 can slide (e.g., translate) forward and rearward along the base 102. In this example, the head 106 is coupled to and/or disposed in the carriage 104 to translate with and rotate relative to the carriage 104. Further, the head 106 is coupled to the base 102 via an example linkage (e.g., a linkage mechanism) 114. In this example, the linkage 114 includes an example lever 116 coupled to and rotatable with the head 106, and an example link 118 rotatably coupled to the lever 116 at a first example joint (e.g., a first pin joint) 120 and rotatably coupled to the base 102 at a second example joint (e.g., a second pin joint) 122 fixed at the base 102. In this example, the first joint 120 and the second joint 122 are double-lap joints. In other examples, at least one of the first joint 120 or the second joint 122 can be a single-lap joint.

FIG. 1B illustrates a top view of the example trailer hitch 100 of FIG. 1A. In the illustrated example of FIG. 1B, the carriage 104 can travel rearward on the rails 110 of the base 102 in an example rearward direction 124 of a vehicle. In some examples, the carriage 104 can travel forward on the base 102 in an example forward direction 126 of FIG. 1B. In some examples, the head 106 is couplable to a trailer via an example top plate 128 such that the head 106 can rotate with the trailer relative to the vehicle. In some examples, the trailer can be coupled to the top plate 128 via a capture plate (not shown).

In some examples, in response to the vehicle making a left turn, the trailer causes the head 106 to rotate clockwise in the example of FIG. 1A. Conversely, in response to the vehicle making a right turn, the trailer causes the head 106 to rotate counterclockwise in the example of FIG. 1A. In some examples, in response to turning of the vehicle, the carriage 104 moves away from a vehicle cab of the vehicle in the rearward direction 124 to increase a clearance between the trailer and the vehicle. Conversely, the carriage 104 moves toward the vehicle cab in the forward direction 126 in response to completion of the turn (e.g., during straightening out and/or realigning of the trailer with respect to the vehicle).

In the illustrated example of FIG. 1B, the trailer hitch 100 is shown in a starting position, in which the linkage 114 is fully extended. For example, the lever 116 and the link 118 in the starting position are substantially parallel to and/or aligned with an example longitudinal axis 130 in the illustrated example of FIG. 1B. In the starting position, the vehicle is not turning such that the head 106 is oriented substantially parallel and/or aligned with the longitudinal axis 130. Furthermore, the carriage 104 and the head 106 in the starting position are at a first position (e.g., a first longitudinal position) on the base 102 proximate the vehicle cab and/or above a rear axle of the vehicle.

As shown in the illustrated example of FIG. 1B, the link 118 is rotatably coupled to the base 102 at the second joint 122 fixed to the base 102, and is further rotatably coupled to the lever 116 at the first joint 120. Further, the lever 116 is fixedly coupled to the head 106 so that the lever 116 rotates with the head 106. As the vehicle turns, the trailer and, thus, the head 106 rotate with respect to the carriage 104. In response to rotation of the head 106 from the starting position, rotation of the lever 116 results in an angular displacement between the lever 116 and the longitudinal axis 130. At the same time, the lever 116 and the link 118 rotate with respect to one another about the first joint 120, and the link 118 further rotates about the second joint 122. As the lever 116 and the link 118 rotate, the linkage 114 pulls the carriage 104 in the rearward direction 124 along the rails 110 to a second position (e.g., a second longitudinal position). Thus, the head 106 and, as a result, the trailer shift rearward relative to the vehicle bed, allowing the trailer to maintain clearance with the vehicle during turning of the vehicle.

In some examples, as the vehicle completes the turn, the head 106 and the trailer return to an angular position that is substantially parallel to and/or aligned with the longitudinal axis 130. Further, the linkage 114 rotates about the first and second joints 120, 122 until the lever 116 and the link 118 are substantially realigned with each other and with the longitudinal axis 130. In such examples, the linkage 114 pushes the carriage 104 in the forward direction 126 on the base 102 until the carriage 104 returns to the first position proximate the vehicle cab.

Figure 2A:
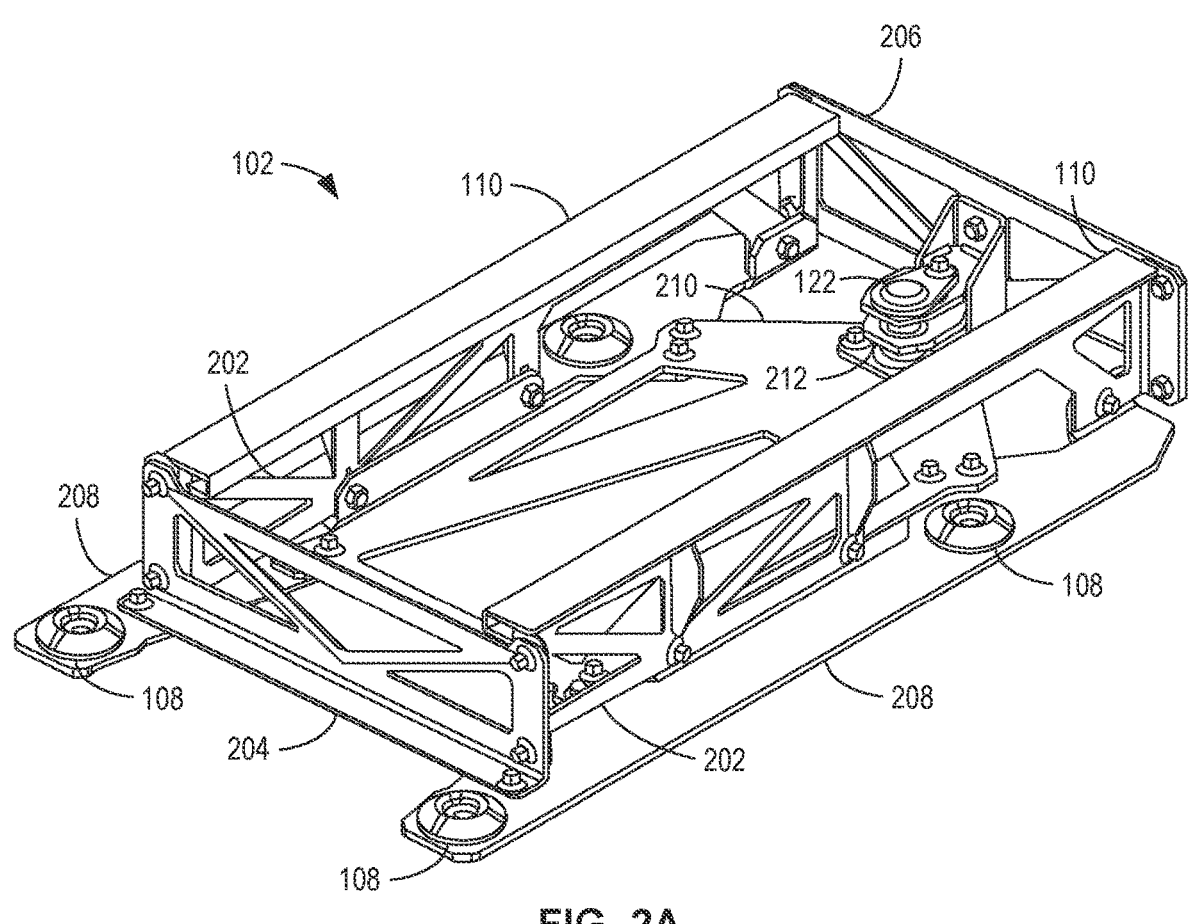
FIG. 2A illustrates an example base of the example trailer hitch of FIGS. 1A and/or 1B.

FIG. 2A illustrates the example base 102 of the example trailer hitch 100 of FIGS. 1A and/or 1B. In the illustrated example of FIG. 2A, the base 102 includes the example rails 110 coupled to respective example side trusses 202. The side trusses 202 are further coupled via example front and rear trusses 204, 206. In the illustrated example of FIG. 2A, the side trusses 202 and the front and rear trusses 204, 206 are coupled to example outer base plates 208, where the outer base plates 208 include the anchor bushings 108 for coupling the base 102 to a vehicle bed and/or a vehicle frame of a vehicle. Further, an example central base plate 210 is coupled between the outer base plates 208. In the illustrated example of FIG. 2A, the side trusses 202, the front truss 204, the rear truss 206, and the central base plate 210 include multiple cutouts. However, in some examples, at least one of the side trusses 202, the front truss 204, the rear truss 206, or the central base plate 210 can be a solid piece of material (e.g., not including the cutouts).

In the illustrated example of FIG. 2A, the rails 110 have a rectangular cross-sectional shape. In other examples, a different cross-sectional shape (e.g., hexagonal, circular, etc.) of the rails 110 can be used instead. In this example, a length of the rails 110 is at least a longitudinal distance travelled by the carriage 104 of FIGS. 1A and/or 1B during turning of a vehicle. In the illustrated example, an example anchor assembly (e.g., a travel limiter) 212 is coupled (e.g., fixedly coupled) to the central base plate 210 and the rear truss 206. In some examples, the anchor assembly 212 is coupled to one of the central base plate 210 or the rear truss 206. In this example, the anchor assembly 212 defines the second joint 122.

Figure 2B:
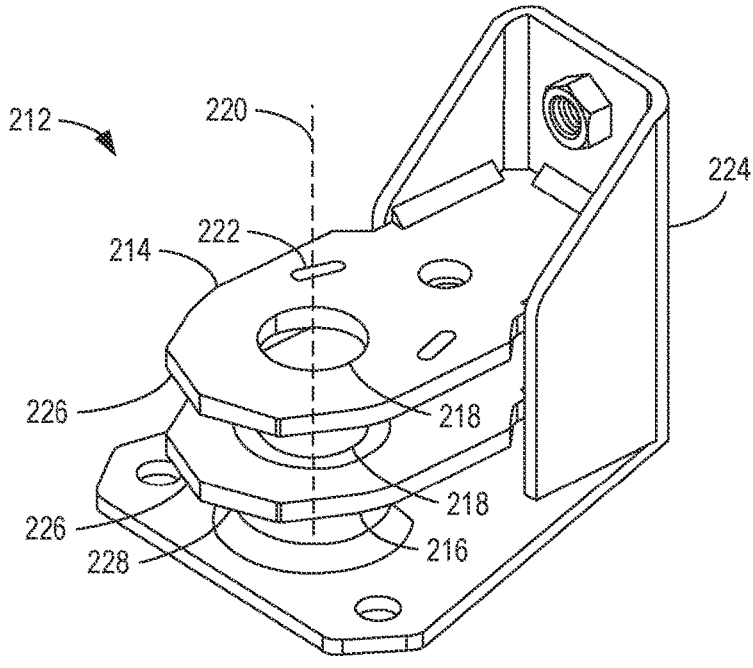
FIG. 2B illustrates a detailed view of the example anchor assembly of FIG. 2A.

FIG. 2B illustrates a detailed view of the example anchor assembly 212 of FIG. 2A. In the illustrated example of FIG. 2B, the anchor assembly 212 is a double-lap joint. In particular, the anchor assembly 212 includes an example upper plate 214 and an example lower plate 216 including openings 218 that define a rotational axis 220 of the second joint 122. In some examples, the link 118 of FIGS. 1A and/or 1B is placed between the upper and lower plates 214, 216, and a pin disposed in the openings 218 and in an opening of the link 118 enables rotation of the link 118 about the rotational axis 220. In this example, the upper plate 214 includes example slots 222 that provide access for prying and/or removing the pin from the openings 218. In the illustrated example, the upper and lower plates 214, 216 are coupled to an example bracket 224 that can be coupled (e.g., bolted) to at least one of the rear truss 206 or the central base plate 210 of FIG. 2A.

In the illustrated example of FIG. 2B, the anchor assembly 212 includes first example contact surfaces 226 and second example contact surfaces 228 on the upper and lower plates 214, 216. In this example, the second contact surfaces 228 are angled relative to the first contact surfaces 226, In some examples, the first and second contact surfaces 226, 228 contact (e.g., engage with) the lever 116 of FIGS. 1A and/or 1B when the lever 116 is rotationally displaced from the longitudinal axis 130 of FIG. 1B by a threshold angle. Accordingly, the first and second contact surfaces 226, 228 prevent an angular displacement of the lever 116 relative to the longitudinal axis 130 from exceeding the threshold angle.

Figure 3A:
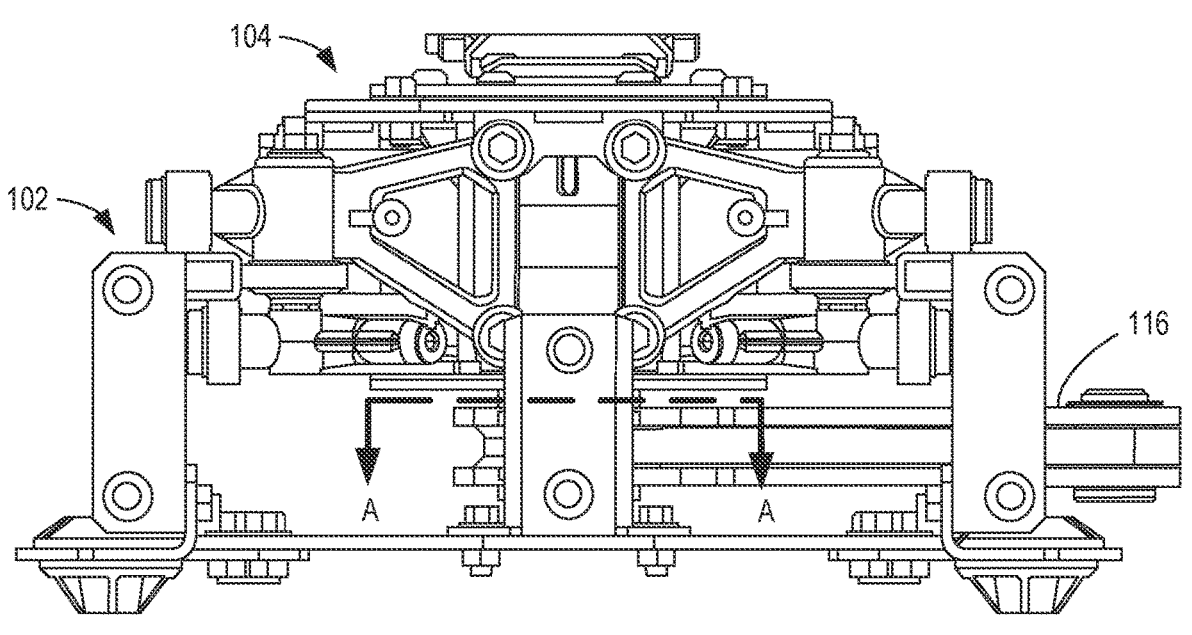
FIG. 3A illustrates a partial front view of the example carriage of FIGS. 1A and/or 1B in a fully deployed position.

FIG. 3A illustrates a partial front view of the carriage 104 of FIGS. 1A and/or 1B in a fully deployed position (e.g., a rearward position) on the example base 102. In some examples, the carriage 104 travels along the rails 110 to the fully deployed position when the head 106 of FIGS. 1A and/or 1B rotates relative to the carriage 104 by a threshold angle. In such examples, the carriage 104 is positioned proximate the rear truss 206 of the base 102 in FIG. 2A. In this example, when the carriage 104 is in the fully deployed position, the lever 116 is rotationally displaced from the longitudinal axis 130 of FIG. 1B by the threshold angle. In some examples, the threshold angle is less than 90 degrees (e.g., approximately 89 degrees).

Figure 3B:
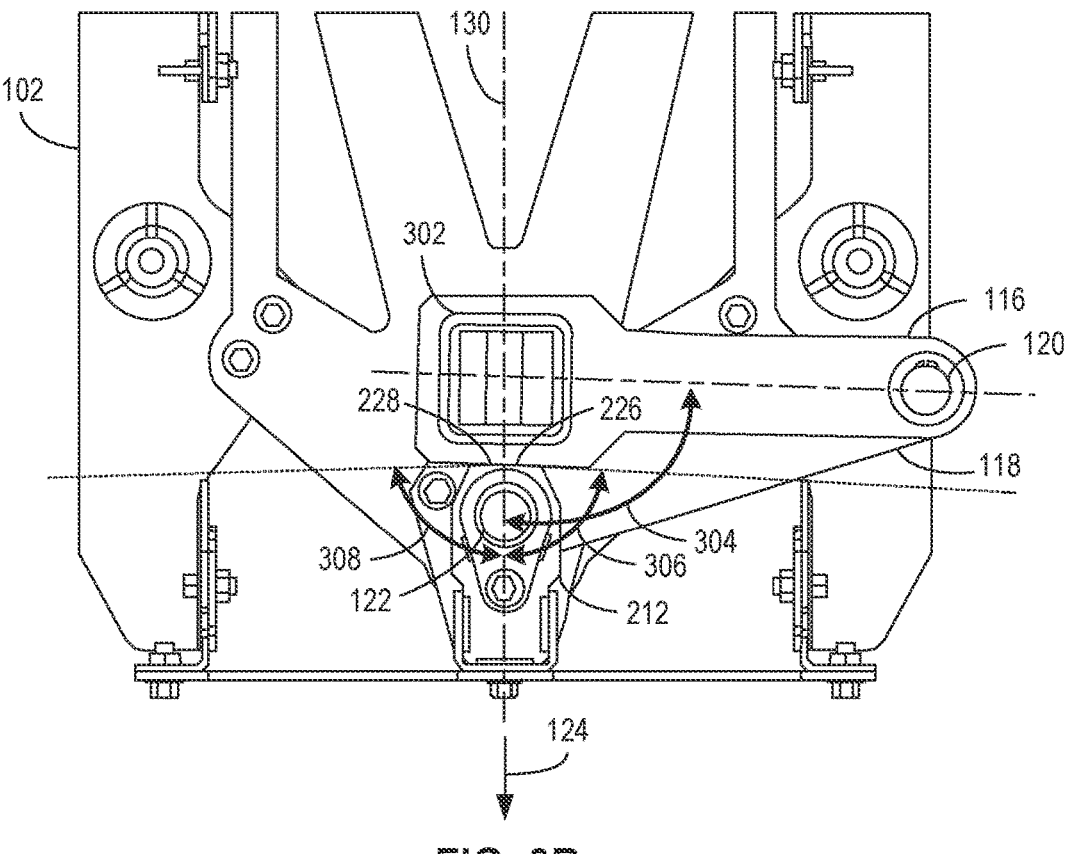
FIG. 3B illustrates a cross-sectional view of the example carriage in the fully deployed position of FIG. 3A taken along line A-A in FIG. 3A.

FIG. 3B illustrates a cross-sectional view of the carriage 104 in the fully deployed position of FIG. 3A taken along line A-A in FIG. 3A. In the illustrated example of FIG. 3B, the lever 116 is coupled to an example column 302 of the head 106 of FIG. 1. As the head 106 rotates (e.g., during turning of a vehicle and/or an attached trailer), the column 302 and, thus, the lever 116 rotate with the head 106 relative to the longitudinal axis 130. In this example, the head 106 and, thus, the lever 116 rotate counterclockwise in FIG. 3B by an example threshold angle 304. Further, as the head 106 and the lever 116 rotate, the link 118 rotates about the first and second joints 120, 122 to cause an angular displacement between the lever 116 and the link 118.

As a result of the angular displacement between the lever 116 and the link 118, the carriage 104 and, thus, the head 106 travel relative to the base 102 in the rearward direction 124. When the head 106 and the lever 116 are in a fully counterclockwise position (e.g., rotated counterclockwise relative to the longitudinal axis 130 by the threshold angle 304), the lever 116 contacts (e.g., engages with) the first contact surfaces 226 of the anchor assembly 212. As such, the anchor assembly 212 prevents the lever 116 and, thus, the head 106 from rotating further in the counterclockwise direction (e.g., more than the threshold angle 304). Conversely, when the head 106 and the lever 116 rotate to a fully clockwise position (e.g., clockwise relative to the to the longitudinal axis 130 by the threshold angle 304), the lever 116 contacts (e.g., engages with) the second contact surfaces 228 of the anchor assembly 212. In such examples, the anchor assembly 212 prevents the lever 116 and, thus, the head 106 from rotating further in the clockwise direction (e.g., more than the threshold angle 304).

In the illustrated example, the threshold angle 304 is based on an angle of the first and second contact surfaces 226, 228 relative to the longitudinal axis 130. For example, a first example angle 306 of the first contact surfaces 226 and a second example angle 308 of the second contact surfaces 228 relative to the longitudinal axis 130 are less than 90 degrees (e.g., approximately 89 degrees), such that the threshold angle 304 (e.g., the angle to which the lever 116 can rotate from the longitudinal axis 130 before contacting the anchor assembly 212) is less than 90 degrees. In some examples, the first and second angles 306, 308 and, thus, the threshold angle 304 can be different (e.g., 90 degrees or greater). In some examples, the first angle 306 of the first contact surfaces 226 can be different from the second angle 308 of the second contact surfaces 228, such that a first threshold angle in a counterclockwise direction is different from a second threshold angle in a clockwise direction.

In some examples in which the head 106 and the lever 116 can rotate 90 degrees or more from the longitudinal axis 130, undesired travel of the carriage 104 in the rearward direction 124 can occur. For example, when the head 106 and the lever 116 rotate 90 degrees or more, the carriage 104 tends to move further in the rearward direction 124 during straightening out and/or realigning of the trailer with respect to the vehicle (e.g., during completion of a turn). In some examples, the anchor assembly 212 can prevent undesired travel of the carriage 104 in the rearward direction 124 by restricting rotation of the lever 116 to the threshold angle 304 of less than 90 degrees.

Figure 4A:
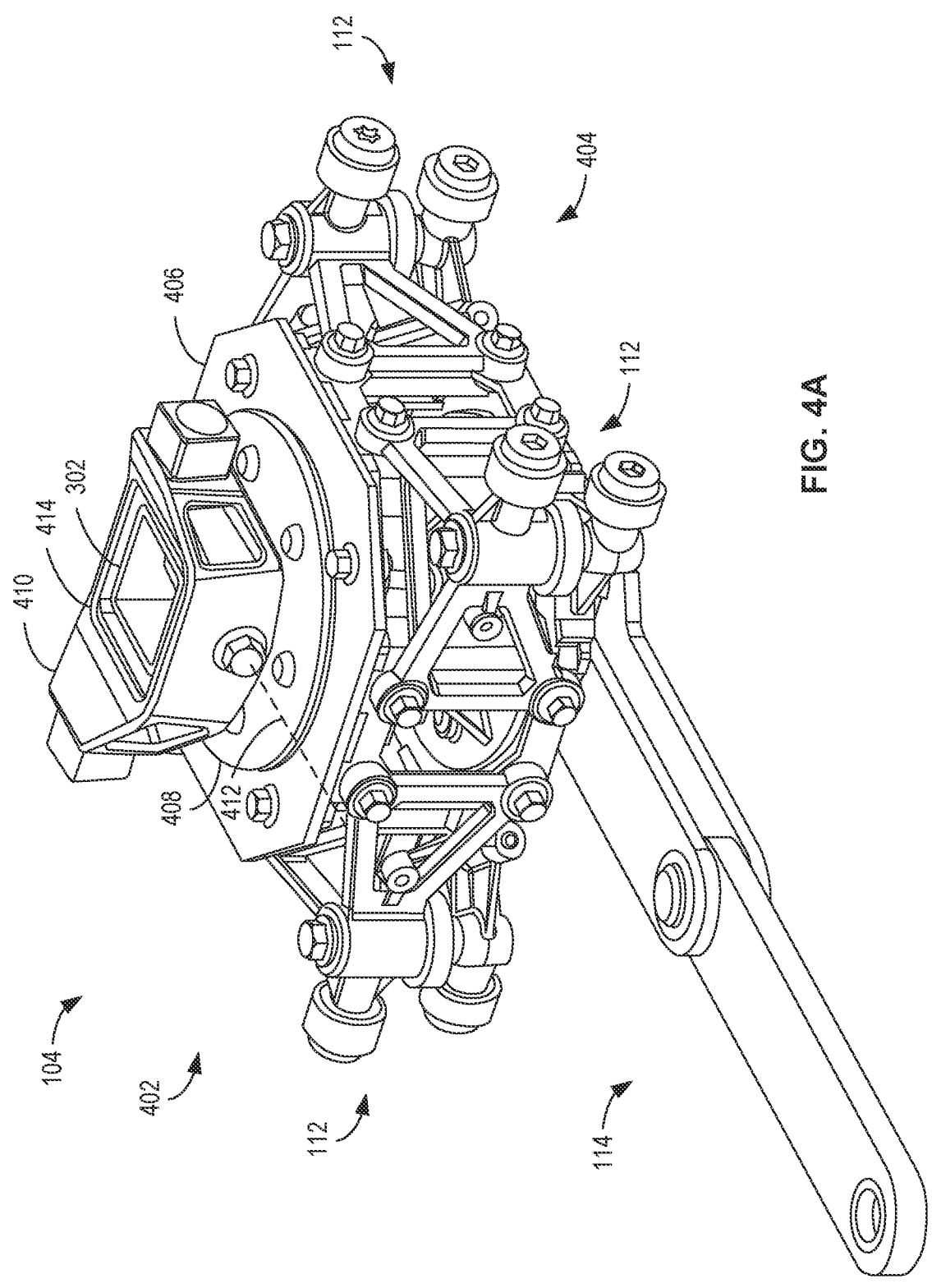
FIG. 4A illustrates a detailed view of the example carriage and the example linkage of FIGS. 1A and/or 1B.

FIG. 4A illustrates a detailed view of the example carriage 104 and the example linkage 114 of FIGS. 1A and/or 1B. In the illustrated example of FIG. 4A, the carriage 104 includes four of the wheel assemblies 112 of FIG. 1A. In particular, the carriage 104 includes two of the wheel assemblies 112 on a first side 402 of the carriage 104 and two of the wheel assemblies 112 on a second side 404 of the carriage 104 opposite the first side 402. In some examples, a different number of the wheel assemblies 112 may be used instead. In some examples, the wheel assemblies 112 are coupled to respective surfaces of the rails 110 of the base 102 of FIG. 2A to enable translation of the carriage 104 relative to the base 102.

In this example, the carriage 104 further includes an example top plate 406 including an opening in which an example upper slew ring 408 is disposed. In some examples, the upper slew ring 408 is rotatable relative to the top plate 406. Further, an example pivot beam 410 is coupled to the upper slew ring 408 to rotate therewith. In some examples, the head 106 of FIGS. 1A and/or 1B is coupled to the pivot beam 410 such that the head 106 can rotate and pivot with the pivot beam 410 about an example pivot axis 412. In some examples, the head 106 and the pivot beam 410 can pivot up to approximately 5 degrees clockwise and/or counterclockwise about the pivot axis 412. In other examples, the head 106 and the pivot beam 410 can be configured to pivot to a different angle about the pivot axis 412 (e.g., up to 8 degrees, up to 10 degrees, etc.). In the illustrated example, the column 302 of the head 106 of FIG. 1 is disposed in an example opening 414 of the pivot beam 410, such that the column 302 is rotatable with the pivot beam 410.

Figure 4B:
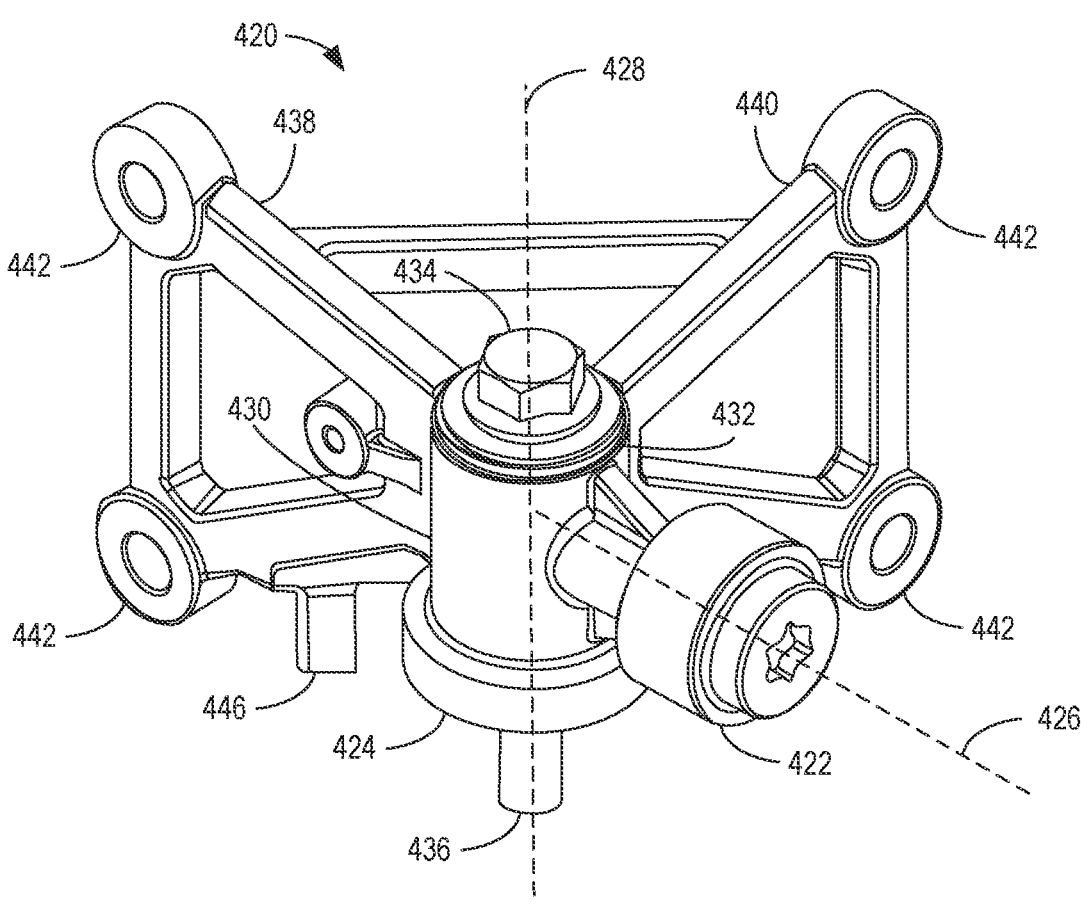
FIG. 4B illustrates an example top portion of one of the example wheel assemblies of FIG. 4A.

FIG. 4B illustrates an example top portion 420 of one of the example wheel assemblies 112 of FIG. 4A. In the illustrated example of FIG. 4B, the top portion 420 includes an example top wheel (e.g., a top roller) 422 and an example guide wheel (e.g., a side wheel, a guide roller) 424. In the illustrated example, the top wheel 422 is configured to rotate about a first example wheel axis 426 and the guide wheel 424 is configured to rotate about a second example wheel axis 428, where the second wheel axis 430 is different from (e.g., orthogonal to) the first wheel axis 428.

In the illustrated example, the top wheel 422 and the guide wheel 424 are coupled to an example housing 430 of the wheel assembly 112. In this example, an example bushing 432 is disposed in the housing 430. Further, an example adjustment bolt 434 is disposed in the bushing 432, and an end 436 of the adjustment bolt 434 extends past the housing 430 and/or the guide wheel 424. In the illustrated example, first and second example mounting arms 438, 440 extend from the housing 430, where the first mounting arm 438 is substantially perpendicular to the second mounting arm 440. In this example, the first and second mounting arms 438, include example attachment bosses 442 for coupling the wheel assembly 112 to a frame of the carriage 104. The first and second mounting arms 438, 440 further including pivot arm mounts 446 that are disposed at an angle relative to the attachment bosses 442.

Figure 4C:
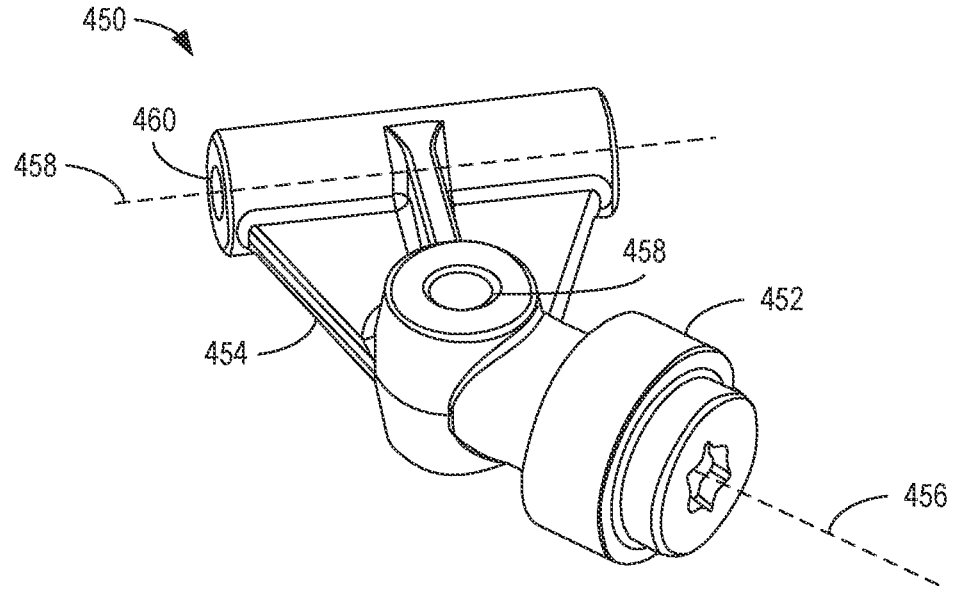
FIG. 4C illustrates an example bottom portion of one of the example wheel assemblies of FIG. 4A.

FIG. 4C illustrates an example bottom portion 450 of one of the example wheel assemblies 112 of FIG. 4A. In the illustrated example of FIG. 4C, the bottom portion 450 includes an example bottom wheel (e.g., a bottom roller) 452 coupled to an example pivot arm 454. In this example, the bottom wheel 452 is configured to rotate about a third example wheel axis 456. In some examples, the third wheel axis 456 is substantially parallel to the first wheel axis 426 of FIG. 4B. In the illustrated example, the pivot arm 454 includes an example opening 460 in which the end 436 of the adjustment bolt 434 of FIG. 4B can be inserted to couple the bottom portion 450 of the wheel assembly 112 to the top portion 420 of FIG. 4B. Further, the pivot arm 454 is configured to pivot about an example pivot axis 458 by positioning the pivot arm 454 between the pivot arm mounts 446 of FIG. 4B and inserting a pin into at least one of the pivot arm mounts 446 and an example pivot opening 460 of the pivot arm 454.

Figure 4D:
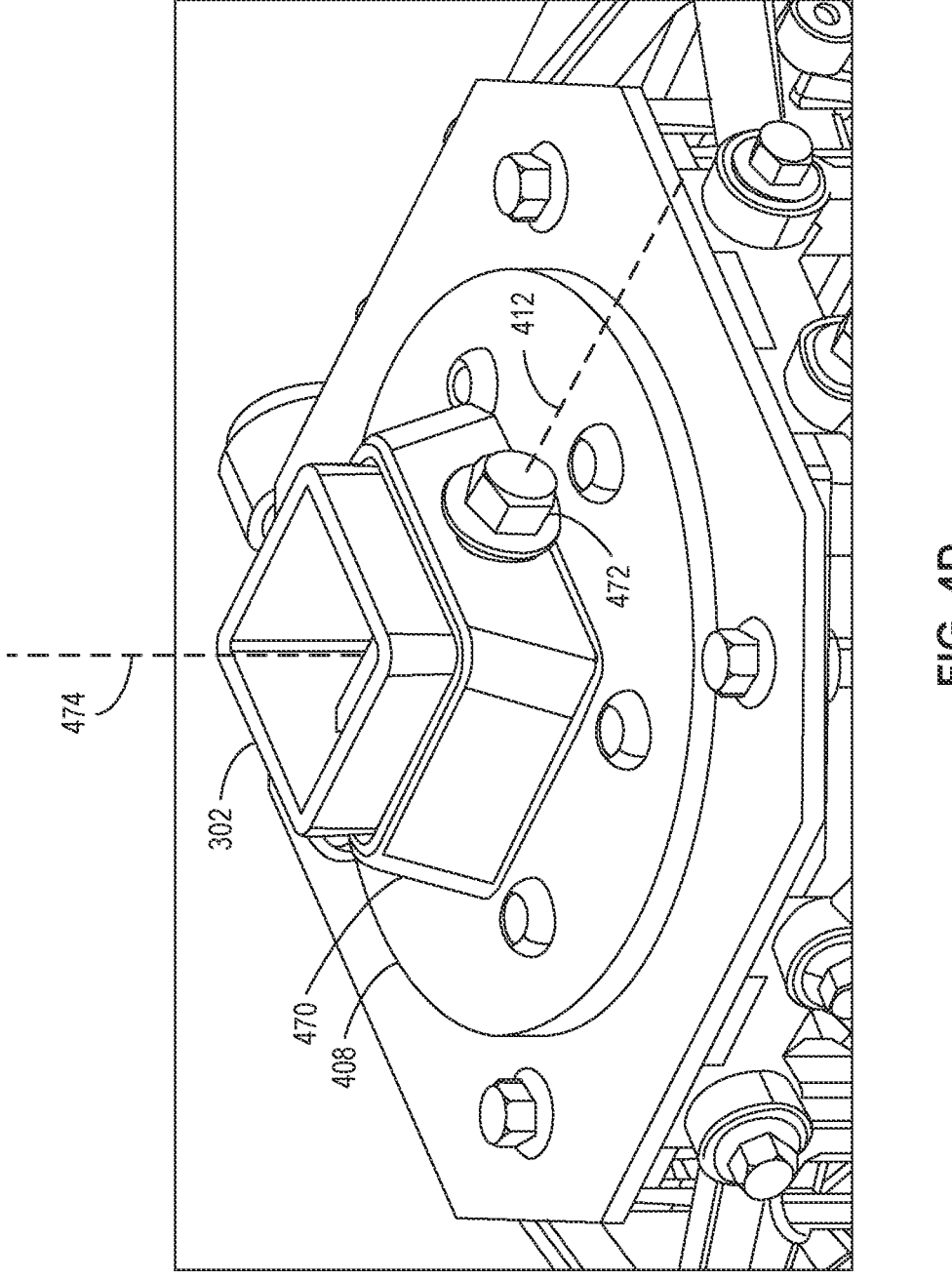
FIG. 4D illustrates a partial view of the example carriage of FIG. 4A with the example pivot head removed.

FIG. 4D illustrates a partial view of the carriage 104 of FIG. 4A with the example pivot beam 410 of FIG. 4A removed. In the illustrated example of FIG. 4D, an example isolator 470 is coupled to the column 302 via an example pivot pin 472 defining the pivot axis 412. Additionally or alternatively, the isolator 470 can be coupled to the upper slew ring 408. In this example, the isolator 470 is positioned at least partially around the column 302. In some examples, the isolator 470 can be disposed in the opening 414 of the pivot beam 410 of FIG. 4A between the column 302 and the pivot beam 410. In some examples, the pivot beam 410, the upper slew ring 408, and the isolator 470 are rotatable with the column 302 about an example column axis 474, and the pivot beam 410 is pivotable relative to the column 302 and/or the isolator 470 about the pivot axis 412.

In the illustrated example, isolator 416 includes an elastomeric material. Further, one or more surfaces of the isolator 470 are angled relative to a surface of the column 302. In some examples, the angled surfaces of the isolator 416 bias the pivot beam 410 and/or the head 106 to a substantially level position (e.g., not tilted relative to the pivot axis 412). Further, the isolator 470 can absorb shock loads and/or vibrations that may be generated during coupling of a trailer to the head 106 and/or during vehicle travel over uneven terrain.

Figure 5A:
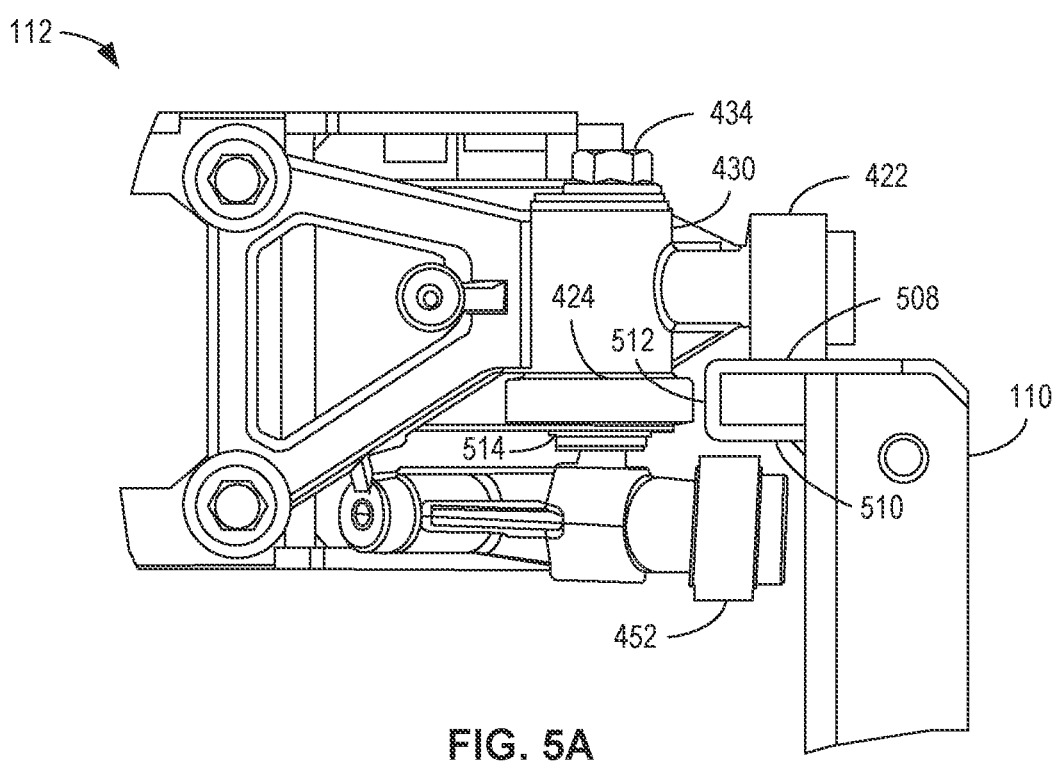
FIG. 5A illustrates a front view of one of the example wheel assemblies of the example carriage of FIG. 4.

FIG. 5A illustrates a front view of one of the example wheel assemblies 112 of FIG. 4A. In the illustrated example of FIG. 5A, at least one of the top wheel 422, the bottom wheel 452, or the guide wheel 424 of the wheel assembly 112 is/are configured to roll along a respective one of the rails 110. In the illustrated example, the rail 110 includes an example top surface (e.g., an upper surface) 508, an example bottom surface (e.g., a lower surface) 510, and an example side surface (e.g., an inner surface) 512. In this example, an example retaining ring 514 is positioned at a lower surface of the guide wheel 424 to secure a position of the guide wheel 424 proximate a bottom of the housing 430.

Figure 5B:
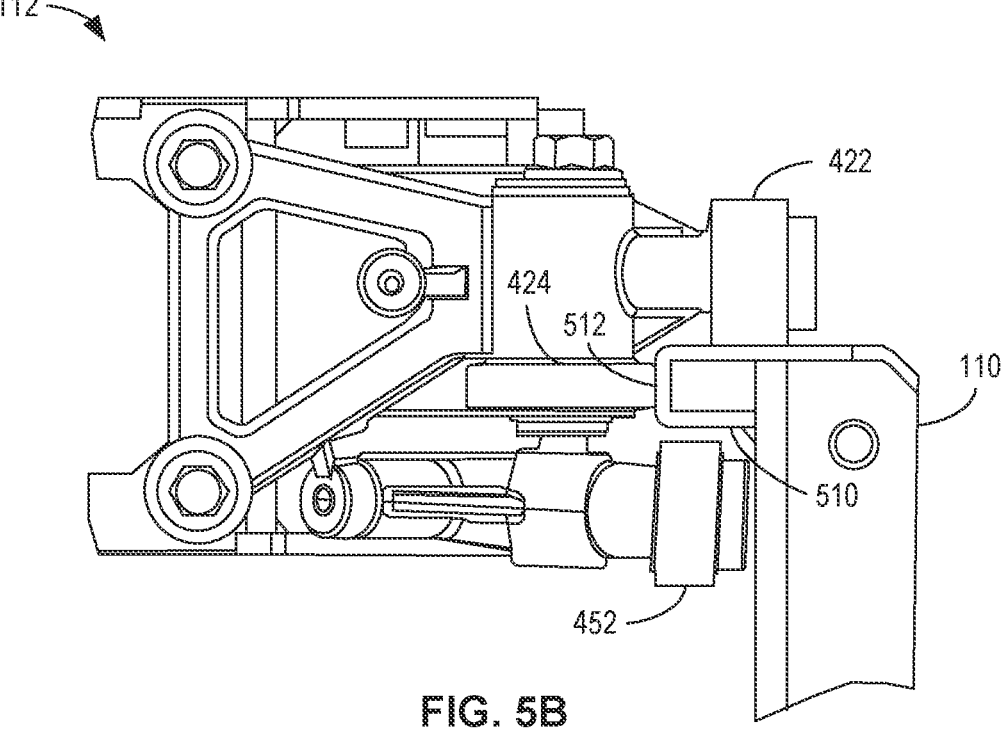
FIG. 5B illustrates a front view of the example wheel assembly of FIG. 5A with the example guide wheel contacting the example rail.
Figure 6A:
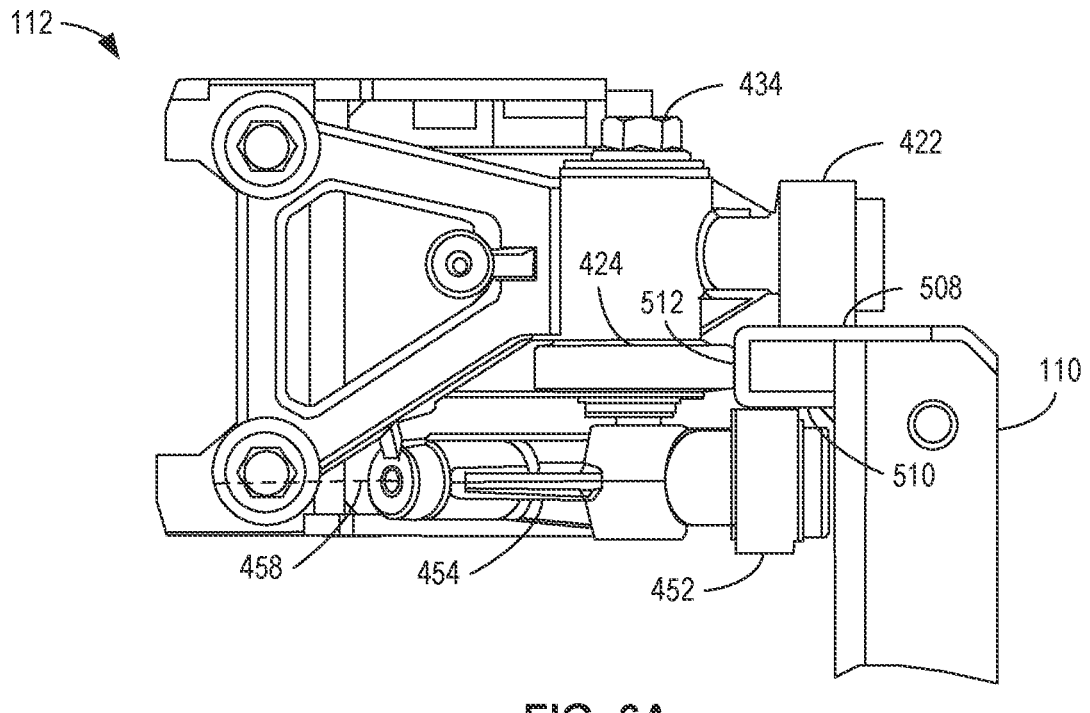
FIG. 6A illustrates a front view of the example wheel assembly of FIGS. 5A and/or 5B with the example bottom wheel contacting the example rail.

An example process for coupling the carriage 104 to the rails 110 is shown in FIGS. 5A, 5B, and 6A. For example, in FIG. 5A, the wheel assembly 112 of the carriage 104 is positioned relative to the rail 110 such that the top wheel 422 contacts the top surface 508 of the rail 110. In the example of FIG. 5A, the bottom wheel 452 and the guide wheel 424 do not contact the rail 110. Turning to FIG. 5B, the rail 110 is moved toward the guide wheel 424 such that the guide wheel 424 contacts the side surface 512 of the rail 110. In this example, a gap remains between the bottom wheel 452 and the bottom surface 510 of the rail 110.

In the illustrated example of FIG. 6A, the bottom wheel 452 is moved toward the rail 110 to contact the bottom surface 510 of the rail 110. In some examples, a distance between the top wheel 422 and the bottom wheel 452 can be adjusted by tightening and/or loosening of the adjustment bolt 434. In this example, the bottom wheel 452 is moved toward the bottom surface 510 by tightening the adjustment bolt 434. In such examples, the tightening of the adjustment bolt 434 causes the pivot arm 454 to pivot upward about the pivot axis 458, thus causing the bottom wheel 452 to move upward in FIG. 6A to reduce a distance between the top wheel 422 and the bottom wheel 452. In some examples, the adjustment bolt 434 can be used to adjust a clamping force of the top and bottom wheels 422, 452 on the rail 110. For example, the adjustment bolt 434 can be further tightened to increase the clamping force of the top wheel 422 and the bottom wheel 452 on the top surface 508 and the bottom surface 510, respectively. Conversely, the adjustment bolt 434 can be loosened to reduce the clamping force of the top and bottom wheels 422, 452. In some examples, the clamping force is adjusted to within a threshold range that enables the top and bottom wheels 422, 452 to remain in contact with the rail 110 without preventing rotation of the top and bottom wheels 422, 452.

In the example of FIG. 6A, the top wheel 422 rolls along the top surface 508, the bottom wheel 452 rolls along the bottom surface 510, and the guide wheel 424 rolls along the side surface 512 to move (e.g., translate) the carriage 104 of FIG. 4 relative to the base 102 of FIG. 2A. In some examples, a different number of the wheels 422, 452, 424 may be used instead. For example, the wheel assembly 112 can include one or more additional wheels to roll along at least one of the top surface 508, the bottom surface 510, or the side surface 512 of the rail 110. In some examples, the wheel assembly 112 does not include at least one of the bottom wheel 452 or the guide wheel 424. While the wheel assembly 112 is used to move the carriage 104 along the base 102 in this example, a different technique (e.g., roller bearings sliding along cylindrical rails) may be used instead.

Figure 6B:
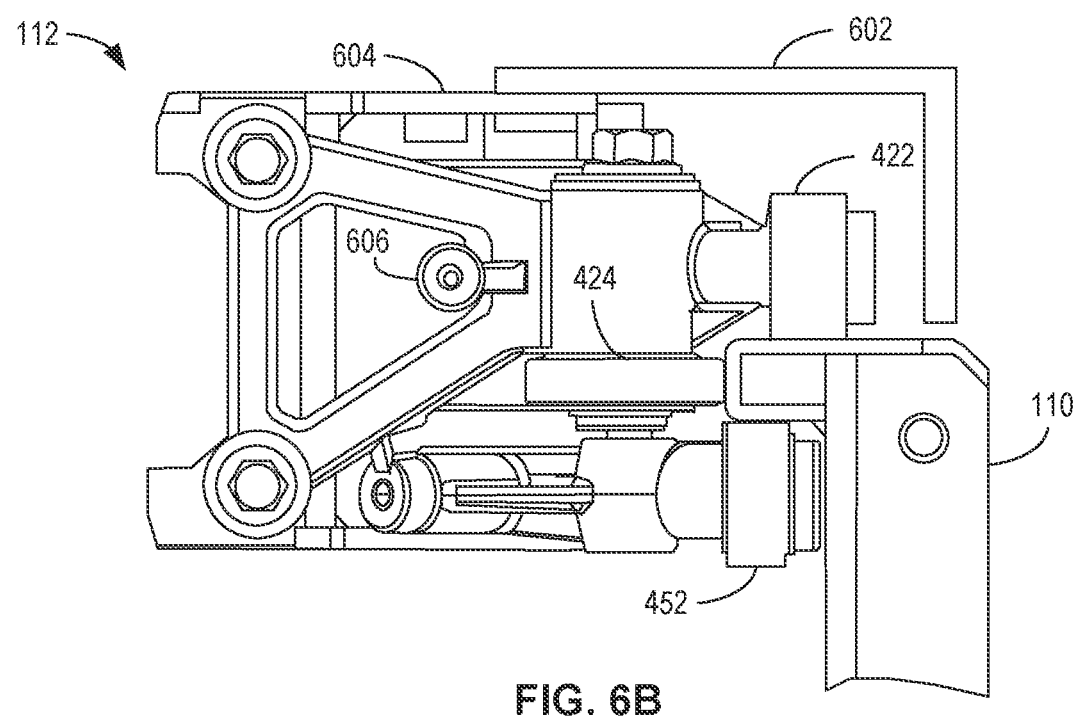
FIG. 6B illustrates a front view of the example wheel assembly of FIG. 6A including an example shroud.

FIG. 6B illustrates the example wheel assembly 112 of FIG. 6A including an example shroud 602. In the illustrated example of FIG. 6B, the shroud 602 is coupled to an example support structure 604 of the wheel assembly 112 to restrict and/or prevent debris from entering the wheel assembly 112 and interfering with the rotation of the wheels 422, 452, 424. While the shroud 602 is coupled to the support structure 604 in this example, the shroud 602 can additionally or alternatively be coupled to the rail 110 and/or can extend along at least a portion of the length of the rail 110. In some examples, the shroud 602 is coupled to an example boss 606 of the wheel assembly 112 in addition to or instead of the support structure 604 and/or the rail 110.

Figures 7A, 7B, 7C:
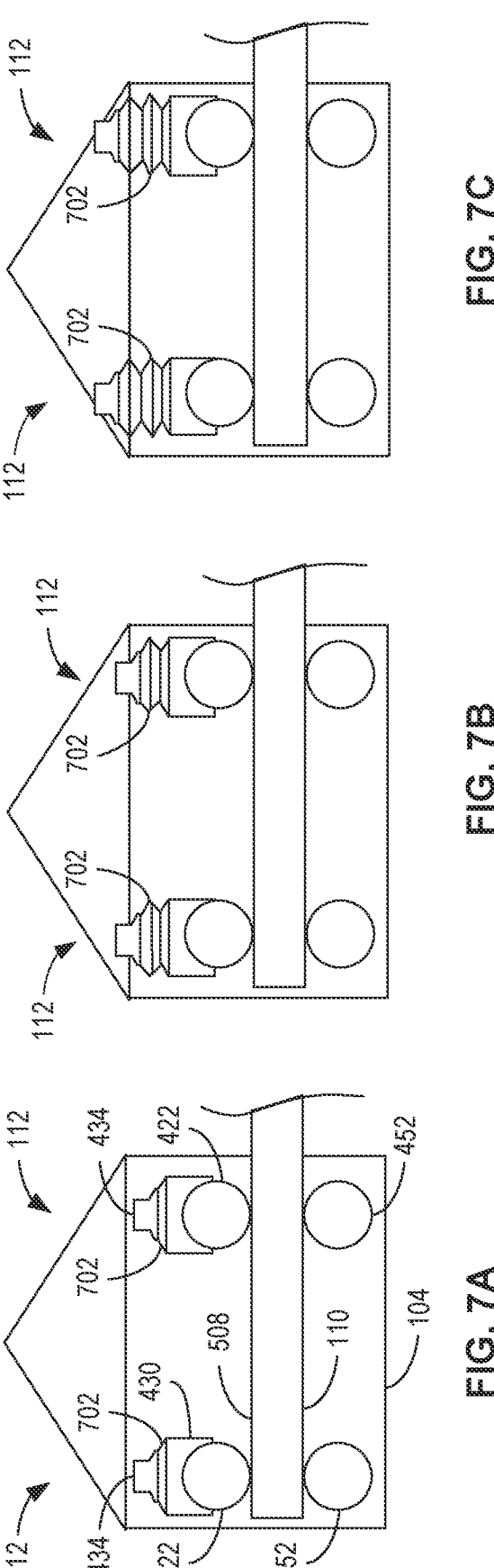
FIG. 7A is a schematic illustration of the example carriage sliding along the example rail, where the example wheel assemblies include an example damper.
FIG. 7B is a schematic illustration of the example carriage sliding along the example rail, where the example wheel assemblies include three of the example dampers.
FIG. 7C is a schematic illustration of the example carriage sliding along the example rail, where the example wheel assemblies include five of the example dampers.

FIG. 7A is a schematic illustration of the carriage 104 sliding along the rails 110 via one or more of the wheel assemblies 112. In the illustrated example of FIG. 7A, an example damper (e.g., a shock absorber) 702 is operatively coupled between the adjustment bolt 434 and the 422a top of the housing 430 of each of the wheel assemblies 112. In this example, the damper 702 is implemented as a disc spring. In some examples, a different type of damper (e.g., a compression spring, a conical washer, a Belleville washer, etc.) may be used instead. In some examples, the damper 702 opposes upward movement (e.g., deflection) of the top wheel 422 and/or biases the top wheel 422 toward the top surface 508 of the rail 110. As such, the damper 702 enables the top wheel 422 to remain near and/or against the top surface 508 of the rail 110 when external forces (e.g., a force of a trailer on the carriage 104, vibratory forces generated during travel of a vehicle) cause a deflection of the top wheel 422.

While one of the dampers 702 is implemented in each of the wheel assemblies 112 in this example, a different number of the dampers 702 may be used instead. For example, FIG. 7B illustrates the wheel assemblies 112 including three of the dampers 702. In particular, the three of the dampers 702 are coupled in a stack in each of the wheel assemblies 112. In another example, FIG. 7C illustrates the wheel assemblies 112 including five of the dampers 702. In some examples, a damping force of the wheel assemblies 112 can be adjusted by modifying a number of the dampers 702 implemented therein. Further, while the dampers 702 are operatively coupled to a top of the housing 430 in the illustrated examples of FIGS. 7A, 7B, and 7C, one or more of the dampers 702 can be operatively coupled to a bottom of the housing 430 instead.

Figures 8A, 8B, 8C:
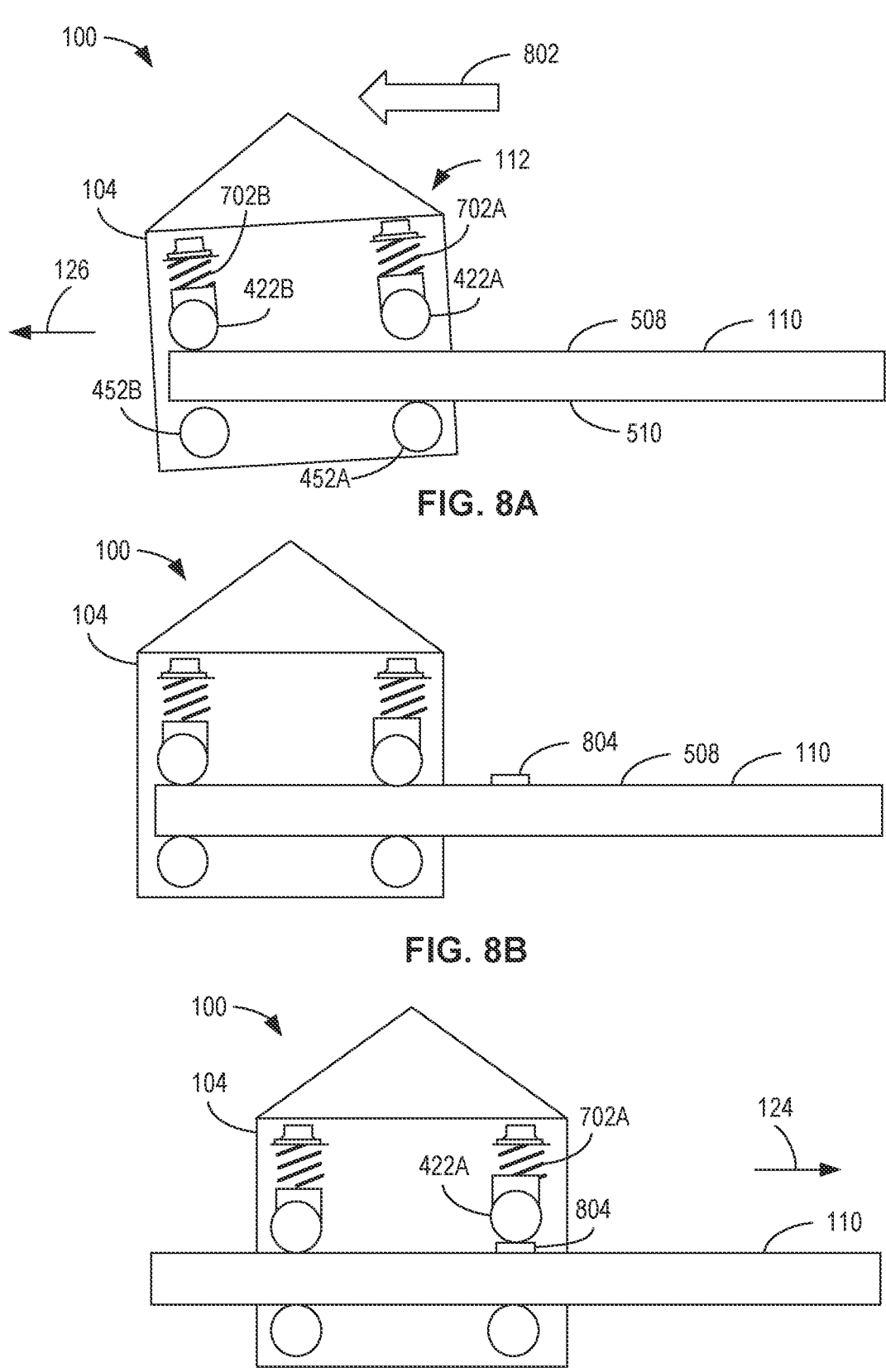
FIG. 8A is a schematic illustration of the example carriage on the example rails of the example trailer hitch of FIGS. 1A and/or 1B in response to an external force on the example carriage.
FIG. 8B is a schematic illustration of the example carriage on the example rails of the example trailer hitch when debris is present on the rails.
FIG. 8C illustrates the example carriage travelling over the debris on the example rail of FIG. 8B.

FIG. 8A is a schematic illustration of the carriage 104 on the rails 110 of the trailer hitch 100 in response to an external force on the carriage 104. In the illustrated example of FIG. 8A, an example force 802 is applied to the carriage 104 in the forward direction 126. In some examples, the force 802 is applied by a trailer coupled to the carriage 104 when a speed of the trailer is greater than a speed of the vehicle pulling the trailer (e.g., during braking of the vehicle). In the illustrated example, the force 802 produces a moment on the carriage 104 in a counterclockwise direction of FIG. 8A, resulting in a deflection of a first one of the top wheels 422A from the top surface 508 of the rail 110 and/or a deflection of one of the bottom wheels 452B from the bottom surface 510 of the rail 110. In some examples, the force 802 on the carriage 104 causes at least one of the damper 702A of the first one of the top wheels 422A or the damper 702B of a second one of the top wheels 422B to compress. In some examples, the dampers 702A, 702B function to return and/or hold the wheels 422A, 422B, 452A, 452B to the respective surfaces 508, 510 of the rail 110. For example, the compressed damper 702B can produce an opposing moment (e.g., in a clockwise direction of FIG. 8A) to cause the first top wheel 422A to return to the top surface 508 of the rail 110 and/or cause the second bottom wheel 452B to return to the bottom surface 510 of the rail 110 when the force 802 is removed and/or reduced.

FIG. 8B is a schematic illustration of the carriage 104 on the rails 110 of the trailer hitch 100 when debris 804 is present on the rail 110. In some examples, the debris 804 includes dirt and/or other contaminants that settle on the top surface 508 of the rail 110 (e.g., during normal operation of a vehicle). In some known trailer hitches, the presence of debris may interfere with regular operation of the known trailer hitches.

Turning to FIG. 8C, the carriage 104 is illustrated travelling over the debris 804 on the rail 110. For example, the carriage 104 travels in the rearward direction 124 relative to the carriage 104 in FIG. 8B, such that the first top wheel 422A contacts the debris 804. In the illustrated example, when the first top wheel 422A rolls over the debris 804, the corresponding damper 702A compresses as a result of an upward deflection of the first top wheel 422A. In some examples, the compressed damper 702A biases the first top wheel 422A to the top surface 508 such that the first top wheel 422A can resume rolling along the top surface 508 after passing the debris 804. As such, examples disclosed herein preserve functionality of the first top wheel 422A and enable the trailer hitch 100 to operate normally in the event that debris is present.

Figure 9:
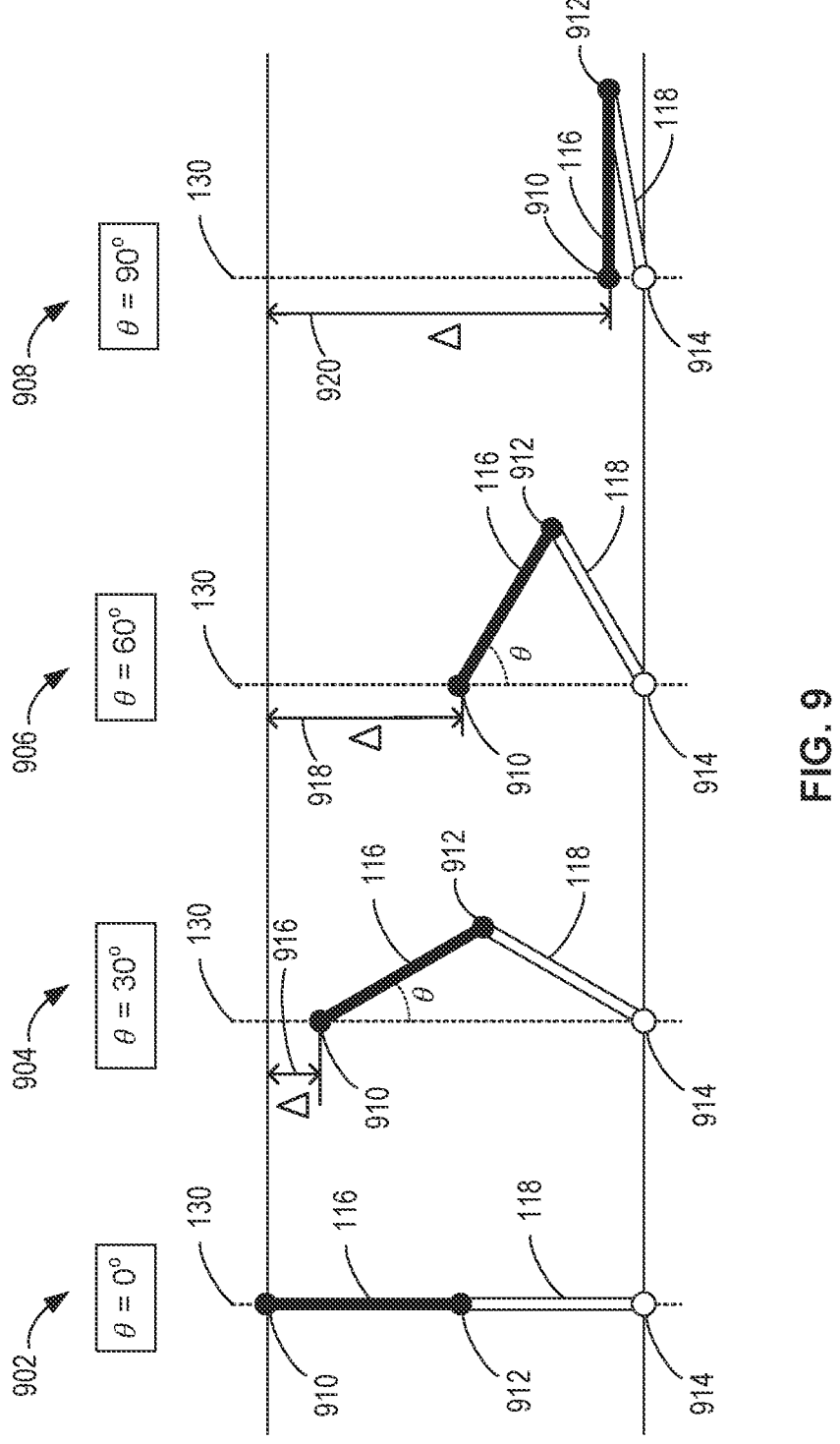
FIG. 9 is a diagram illustrating configurations of the example trailer hitch of FIGS. 1A and/or 1B at different values of angular displacement.

FIG. 9 is a diagram illustrating configurations of the example trailer hitch 100 of FIGS. 1A and/or 1B at different values of angular displacement of the lever 116 relative to the longitudinal axis 130 of FIGS. 1A and/or 1B. In the illustrated example of FIG. 9, an example first configuration 902 corresponds to an angular displacement of 0 degrees, an example second configuration 904 corresponds to an angular displacement of 30 degrees, an example third configuration 906 corresponds to an angular displacement of 60 degrees, and an example fourth configuration 908 corresponds to an angular displacement of 90 degrees. Each of the configurations 902, 904, 906, 908 illustrates the lever 116 and the link 118 of FIGS. 1A and/or 1B defining a first rotational axis 910 of the head 106 of FIGS. 1A and/or 1B, a second rotational axis 912 of the first joint 120 of FIGS. 1A and/or 1B, and a third rotational axis 914 of the second joint 122 of FIGS. 1A and/or 1B. In the illustrated example of FIG. 9, the first rotational axis 910, the second rotational axis 912, and the third rotational axis 914 extend out of the page.

In the first configuration 902, the lever 116 and the link 118 are substantially aligned with the longitudinal axis 130. Furthermore, the first rotational axis 910, the second rotational axis 912, and the third rotational axis 914 are substantially colinear along the longitudinal axis 130. As such, when the trailer hitch 100 is in the example first configuration 902, the trailer hitch 100 is in the starting position as described in connection with FIG. 1B above. For example, the trailer hitch 100 in the starting position corresponds to a vehicle and attached trailer being substantially aligned (e.g., the vehicle is not turning). In the starting position, the carriage 104 is proximate a front of the vehicle bed such that a linear displacement (e.g., Δ) of the carriage 104 (e.g., positioned at the first rotational axis 910) is approximately 0 inches while the vehicle is not turning.

As the vehicle begins to turn, the vehicle rotates with respect to the trailer at the trailer hitch 100. In some examples, the lever 116 and the link 118 move from the first configuration 902 to the second configuration 904 in response to the turning of the vehicle. In the example second configuration 904, rotation of the trailer results in rotation of the lever 116 about the first rotational axis 910 by 30 degrees. In particular, the lever 116 rotates counterclockwise about the first rotational axis 910 such that a displacement angle (e.g., θ) between the lever 116 and the longitudinal axis 130 is 30 degrees. Accordingly, the second rotational axis 912 moves to the right of the longitudinal axis 130, causing the link 118 to rotate clockwise about the third rotational axis 914. Rotation of the link 118 about the third rotational axis 914 (e.g., a fixed axis) results in the lever 116 and the link 118 pulling the first rotational axis 910 and, thus, the head 106 and the carriage 104 rearward toward the third rotational axis 914. In this example, a distance travelled by the carriage 104 corresponds to an example first linear displacement 916 along the longitudinal axis 130.

In response to further turning of the vehicle, the head 106 and the carriage 104 move from the second configuration 904 to the third configuration 906. In such examples, the trailer and/or the head 106 rotate to an angular displacement of approximately 60 degrees from the longitudinal axis 130. The lever 116 rotates further counterclockwise about the first rotational axis 910 by an additional 30 degrees compared to the second configuration 904 and, as such, the link 118 rotates further clockwise about the third rotational axis 914 by an additional 30 degrees. In such examples, the lever 116 and the link 118 further pull the head 106 and the carriage 104 rearward along the longitudinal axis 130. In this example, the distance travelled by the carriage 104 from the corresponds to a second example linear displacement 918 along the longitudinal axis 130, where the second linear displacement 918 is greater than the first linear displacement 916.

In the fourth configuration 908, in response to the vehicle making a full right turn (e.g., the vehicle rotates 90 degrees with respect to the trailer), the lever 116 rotates about the first rotational axis 910 such that the angular displacement between the lever 116 and the longitudinal axis 130 is approximately 90 degrees. In this example, the link 118 rotates further clockwise about the third rotational axis 914. As such, the lever 116 and the link 118 pull the carriage 104 further rearward. The distance travelled by the carriage 104 in the fourth configuration 908 corresponds to a third example linear displacement 920 along the longitudinal axis 130, where the third linear displacement 920 is greater than the first linear displacement 916 and/or the second linear displacement 918.

Upon completion of the turn of the vehicle, the trailer straightens out with respect to the vehicle. In particular, the head 106 and the carriage 104 return to the first configuration 902 from the second configuration 904, the third configuration 906, and/or the fourth configuration 908 by rotation of the lever 116 in a reverse direction (e.g., clockwise) about the first rotational axis 910 until the lever 116 and the link 118 are substantially aligned with and/or parallel to the longitudinal axis 130. In the illustrated example of FIG. 9, the second configuration 904, the third configuration 906, and/or the fourth configuration 908 correspond to the vehicle making a right turn. Alternatively, in response to the vehicle making a left turn, the lever 116 can rotate clockwise about the first rotational axis 910 from the first configuration 902. In such examples, orientations of the lever 116 and the link 118 in the second configuration 904, the third configuration 906, and/or the fourth configuration 908 are reflected (e.g., mirrored) across the longitudinal axis 130, while values of the angular displacement remain the same regardless of whether the vehicle is making a left turn or a right turn.

Figure 10:
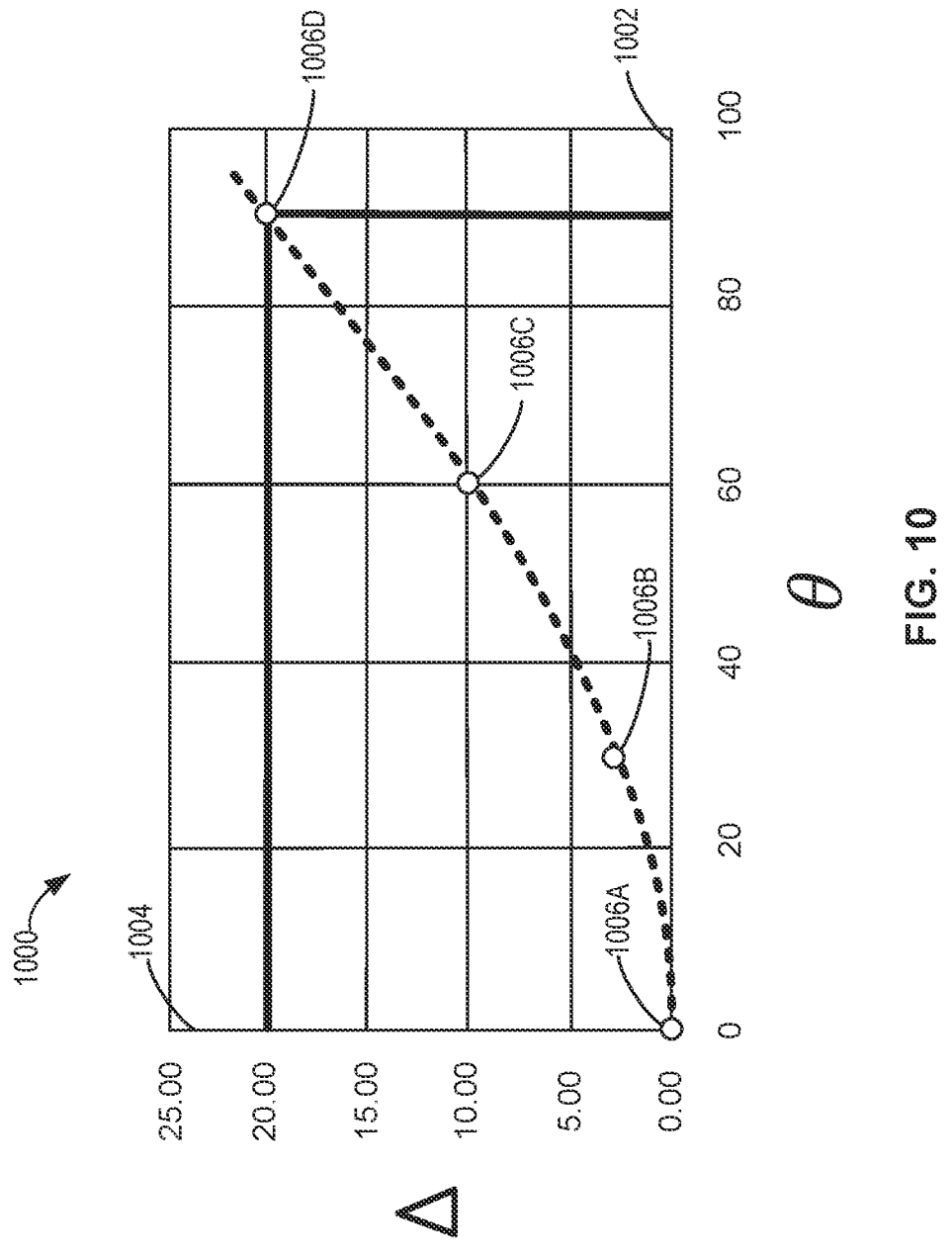
FIG. 10 is a graph illustrating linear displacement of the example carriage of FIGS. 1A and/or 1B with respect to angular displacement of the example lever of FIGS. 1A and/or 1B.

FIG. 10 is an example plot 1000 illustrating linear displacement (e.g., Δ) of the example carriage 104 of FIGS. 1A and/or 1B with respect to angular displacement (e.g., θ) of the example lever 116 of FIGS. 1A and/or 1B. In the illustrated example of FIG. 6, the lever 116 has a length of 11.5 inches and the link 118 has a length of 12 inches. In such examples, a length of the lever 116 corresponds to a distance between the first rotational axis 910 and the second rotational axis 912 of FIG. 9, and a length of the link 118 corresponds to a distance between the second rotational axis 912 and the third rotational axis 914 of FIG. 9. In other examples, a different length for each of the lever 116 and the link 118 may be used. The example plot 1000 includes an example horizontal axis 1002 corresponding to angular displacement θ (e.g., in degrees) and an example vertical axis 1004 corresponding to linear displacement Δ (e.g., in inches). The example plot 1000 further includes an example first point 1006A corresponding to the first configuration 902 of FIG. 9, an example second point 1006B corresponding to the second configuration 904 of FIG. 9, an example third point 1006C corresponding to the third configuration 906 of FIG. 9, and an example fourth point 1006D corresponding to the fourth configuration 908 of FIG. 9.

At the first configuration 902, the vehicle and the trailer are substantially aligned so that the angular displacement and the linear displacement corresponding to the first point 1006A are both zero. At the second configuration 1004 corresponding to the second point 1006B, the angular displacement of 30 degrees corresponds to a linear displacement of approximately 2.7 inches. At the third configuration 1006 corresponding to the third point 1006C, the angular displacement of 60 degrees corresponds to a linear displacement of approximately 10 inches. At the fourth configuration 1008 corresponding to the fourth point 1006D, the angular displacement of 90 degrees corresponds to a linear displacement of approximately 20 inches. In some examples, the linear displacement corresponding to one or more of the angular displacements may be different based on the length of the lever 116 and the length of the link 118.

As shown in the example plot 1000, a parabolic relationship exists between the angular displacement and the linear displacement of the trailer hitch 100. For example, small changes in linear displacement occur at small values of angular displacement (e.g., less than 20 degrees). In some examples, a large turn radius of the vehicle corresponds to a small value of angular displacement of the trailer hitch 100. Advantageously, the trailer hitch 100 has little to no rearward travel during wide turns of the vehicle.

In some examples, the base 102 implements means for coupling rails to a vehicle bed, the carriage 104 implements means for translating, the top wheel 422 implements first means for rolling, the bottom wheel 452 implements second means for rolling, the guide wheel 424 implements third means for rolling, the head 106 implements means for rotating, the damper 702 implements means for damping, and the adjustment bolt 434 implements means for adjusting a clamping force.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that automatically shift a trailer rearward on a vehicle to maintain clearance between the trailer and the vehicle during turning. The disclosed methods, apparatus and articles of manufacture improve the efficiency of a trailer hitch by implementing a linkage to control motion of the trailer hitch, where the linkage is easier to manufacture and is more durable compared to a cam mechanism used in a typical sliding trailer hitch. Furthermore, the disclosed methods, apparatus and articles of manufacture implement adjustable wheel assemblies that slide along rails to enable travel of the trailer hitch. Disclosed systems, methods, apparatus, and articles of manufacture are accordingly directed to one or more improvement(s) in the operation of a machine or other mechanical device.

An example autoslide trailer hitch having an adjustable wheel assembly is disclosed herein. Further examples and combinations thereof include the following:

Example 1 includes a trailer hitch comprising a base fixedly couplable to a vehicle bed of a vehicle, the base including a rail, a carriage slidably coupled to the rail via at least one wheel assembly, the at least one wheel assembly including a first wheel to contact a top surface of the rail, and a second wheel to contact a bottom surface of the rail, and a head rotatably coupled to the carriage, the carriage to slide along the rail between a first position and a second position in response to rotation of the head.

Example 2 includes the trailer hitch of example 1, wherein the wheel assembly further includes a third wheel to contact a side surface of the rail.

Example 3 includes the trailer hitch of example 1, further including at least one damper operatively coupled to at least one of the first wheel or the second wheel.

Example 4 includes the trailer hitch of example 1, further including a shroud coupled to one of the carriage or the base, the shroud to at least partially cover at least one of the first wheel or the second wheel.

Example 5 includes the trailer hitch of example 1, further including a lever coupled to a column of the head, the lever to rotate with the head, a link rotatably coupled to the lever at a first pin joint, and an anchor assembly fixed at the base, the link rotatably coupled to the anchor assembly at a second pin joint, a surface of the anchor assembly to engage with the lever when the carriage is in the second position.

Example 6 includes the trailer hitch of example 5, wherein an angle between the surface of the anchor assembly and a longitudinal axis extending between the first and second positions is less than 90 degrees.

Example 7 includes the trailer hitch of example 1, wherein the at least one wheel assembly further includes an adjustment bolt to adjust a clamping force of the first wheel and the second wheel on the rail.

Example 8 includes the trailer hitch of example 1, wherein a cross-section of the rail is rectangular.

Example 9 includes a trailer hitch comprising a base, a carriage slidably coupled to rails of the base, the carriage including first rollers to roll along an upper surface of the rails, second rollers to roll along a lower surface of the rails, and third rollers to roll along a side surface of the rails, and a head rotatably coupled to the carriage, the carriage to slide along the rails between a first position and a second position in response to a rotation of the head.

Example 10 includes the trailer hitch of example 9, wherein first rotational axes of the third rollers are substantially orthogonal to second rotational axes of the first and second rollers.

Example 11 includes the trailer hitch of example 9, further including at least one damper operatively coupled to at least one of the first rollers or the second rollers.

Example 12 includes the trailer hitch of example 9, further including a shroud coupled to one of the carriage or the base, the shroud to at least partially cover at least one of the first rollers or the second rollers.

Example 13 includes the trailer hitch of example 9, further including a lever coupled to a column of the head, the lever to rotate with the head, a link rotatably coupled to the lever at a first joint, and an anchor assembly coupled to the base, the link rotatably coupled to the anchor assembly at a second joint, a surface of the anchor assembly to engage with the lever when the carriage is in the second position.

Example 14 includes the trailer hitch of example 13, wherein an angle between the surface of the anchor assembly and a longitudinal axis extending between the first and second positions is less than 90 degrees.

Example 15 includes the trailer hitch of example 13, wherein at least one of the first joint or the second joint is a double-lap joint.

Example 16 includes an apparatus comprising means for coupling rails to a vehicle bed, means for translating slidably coupled to the means for coupling, the means for translating including first means for rolling to contact a top surface of the rails, and second means for rolling to contact a bottom surface of the rails, and means for rotating rotatably coupled to the means for translating, the means for translating to slide along the means for coupling between a first position and a second position in response to rotation of the means for rotating.

Example 17 includes the apparatus of example 16, wherein the means for translating further includes third means for rolling to contact a side surface of the rails.

Example 18 includes the apparatus of example 16, further including means for damping operatively coupled to at least one of the first means for rolling or the second means for rolling.

Example 19 includes the apparatus of example 16, further including means for adjusting a clamping force of the first means for rolling and the second means for rolling on the rails.

Example 20 includes the apparatus of example 16, wherein a cross-section of the rails is rectangular.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A trailer hitch comprising:
a base fixedly couplable to a vehicle bed of a vehicle, the base including a rail;
a carriage slidably coupled to the rail via at least one wheel assembly, the at least one wheel assembly including:
a first wheel to contact a top surface of the rail; and
a second wheel to contact a bottom surface of the rail; and
a head rotatably coupled to the carriage, the carriage to slide along the rail between a first position and a second position in response to rotation of the head.

2. The trailer hitch of claim 1, wherein the wheel assembly further includes a third wheel to contact a side surface of the rail.

3. The trailer hitch of claim 1, further including at least one damper operatively coupled to at least one of the first wheel or the second wheel.

4. The trailer hitch of claim 1, further including a shroud coupled to one of the carriage or the base, the shroud to at least partially cover at least one of the first wheel or the second wheel.

5. The trailer hitch of claim 1, further including:
a lever coupled to a column of the head, the lever to rotate with the head;
a link rotatably coupled to the lever at a first pin joint; and
an anchor assembly fixed at the base, the link rotatably coupled to the anchor assembly at a second pin joint, a surface of the anchor assembly to engage with the lever when the carriage is in the second position.

6. The trailer hitch of claim 5, wherein an angle between the surface of the anchor assembly and a longitudinal axis extending between the first and second positions is less than 90 degrees.

7. The trailer hitch of claim 1, wherein the at least one wheel assembly further includes an adjustment bolt to adjust a clamping force of the first wheel and the second wheel on the rail.

8. The trailer hitch of claim 1, wherein a cross-section of the rail is rectangular.

9. A trailer hitch comprising:

a base;

a carriage slidably coupled to rails of the base, the carriage including:

first rollers to roll along an upper surface of the rails;

second rollers to roll along a lower surface of the rails; and third rollers to roll along a side surface of the rails; and a head rotatably coupled to the carriage, the carriage to slide along the rails between a first position and a second position in response to a rotation of the head.

10. The trailer hitch of claim 9, wherein first rotational axes of the third rollers are substantially orthogonal to second rotational axes of the first and second rollers.

11. The trailer hitch of claim 9, further including at least one damper operatively coupled to at least one of the first rollers or the second rollers.

12. The trailer hitch of claim 9, further including a shroud coupled to one of the carriage or the base, the shroud to at least partially cover at least one of the first rollers or the second rollers.

13. The trailer hitch of claim 9, further including:

a lever coupled to a column of the head, the lever to rotate with the head;

a link rotatably coupled to the lever at a first joint; and an anchor assembly coupled to the base, the link rotatably coupled to the anchor assembly at a second joint, a surface of the anchor assembly to engage with the lever when the carriage is in the second position.

14. The trailer hitch of claim 13, wherein an angle between the surface of the anchor assembly and a longitudinal axis extending between the first and second positions is less than 90 degrees.

15. The trailer hitch of claim 13, wherein at least one of the first joint or the second joint is a double-lap joint.

16. An apparatus comprising:

means for coupling rails to a vehicle bed;

means for translating slidably coupled to the means for coupling, the means for translating including:

first means for rolling to contact a top surface of the rails; and second means for rolling to contact a bottom surface of the rails; and means for rotating rotatably coupled to the means for translating, the means for translating to slide along the means for coupling between a first position and a second position in response to rotation of the means for rotating.

17. The apparatus of claim 16, wherein the means for translating further includes third means for rolling to contact a side surface of the rails.

18. The apparatus of claim 16, further including means for damping operatively coupled to at least one of the first means for rolling or the second means for rolling.

19. The apparatus of claim 16, further including means for adjusting a clamping force of the first means for rolling and the second means for rolling on the rails.

20. The apparatus of claim 16, wherein a cross-section of the rails is rectangular.

* * * * *